| United States Patent [19] | [11] | 4,285,891 |
|---|---|---|
| Bray et al. | [45] | Aug. 25, 1981 |

[54] METHOD OF REMOVING FISSION GASES FROM IRRADIATED FUEL

[75] Inventors: Lane A. Bray, Richland; Allyn L. Boldt, Kennewick; Harold H. Van Tuyl, Richland, all of Wash.

[73] Assignee: Exxon Nuclear, Inc., Bellevue, Wash.

[21] Appl. No.: 108,376

[22] Filed: Dec. 31, 1979

[51] Int. Cl.³ ............................................. G21C 21/00
[52] U.S. Cl. ........................................ 264/0.5; 176/37
[58] Field of Search ............................. 176/37; 264/0.5

[56] References Cited

U.S. PATENT DOCUMENTS

| 3,890,424 | 6/1975 | Davies | 264/0.5 |
| 3,969,631 | 7/1976 | Winsche et al. | 176/9 X |
| 3,993,541 | 11/1976 | Nieder | 176/37 |
| 3,993,542 | 11/1976 | Blum et al. | 176/37 |
| 4,124,659 | 11/1978 | della Porta et al. | 264/0.5 |

OTHER PUBLICATIONS

U.S. Atomic Energy Commission Report ORNL-T-M-3180, LMFBR Fuel Cycle Studies Progress Report for Sep. 1970, No. 19, pp. 7 to 11.
U.S. Atomic Energy Commission Report ORNL-T-M-3624, LMFBR Fuel Cycle Studies Progress Report for Oct. 1971, No. 32, pp. 17 to 20.

*Primary Examiner*—Leland A. Sebastian
*Attorney, Agent, or Firm*—Eugene Zagarella, Jr.

[57] ABSTRACT

A method for removing volatile fission products from irradiated fuel which comprises passing a hydrogen-containing inert gas by said fuel which is at an elevated temperature of at least about 1000° C. for a sufficient time to remove a significant portion of said fission products and a second step wherein inert gas alone is swept past the fuel while at said elevated temperature.

11 Claims, No Drawings

METHOD OF REMOVING FISSION GASES FROM IRRADIATED FUEL

BACKGROUND OF THE INVENTION

This invention relates to a method for removing volatile fission products from irradiated fuel by first passing a hydrogen-containing inert gas by said fuel which is heated to an elevated temperature of at least 1000° C. and then passing inert gas alone by said fuel which is at said elevated temperature.

One of the problems associated with the use of nuclear fuel in power production and particularly the reprocessing of irradiated nuclear fuel is the ability to handle and confine the gaseous fission products formed during reactor operations. It is anticipated that in order to satisfy the world's electrical needs as we approach the year 2000, there will be an increasing amount of irradiated fuel produced. Along with the increased volume of irradiated fuel, significant amounts of fission products such as tritium, krypton, xenon and iodine will be formed. Recovery of fission products in nuclear fuel reprocessing plants of conventional designs is not practical because of the relatively small amounts of such products in each ton of fuel. This is particularly true of the hydrogen isotope tritium, which has a half life of 12.26 years and is a ternary fission product produced in relatively small quantities of about 1/1000 of an oz. in each ton of fuel. Such tritium fission product, in the form of tritiated water, becomes intimately mixed with thousands of gallons of process water. It would be necessary to remove the tritium from the large volume of water by a technique such as isotopic separation before the water could be released as either liquid or vapor. It is desirable to develop a suitable alternative method for removal of volatile fission products from irradiated fuel prior to initiation of the reprocessing procedure.

One process for the removal of volatile fission products from irradiated fuel prior to reprocessing has been developed by Oak Ridge National Laboratories and is referred to as voloxidation. Voloxidation, described in Oak Ridge National Laboratories Report ORNL-TM-3723, is a process for oxidizing irradiated fuel in the presence of air or oxygen at a controlled temperature in order to form a very fine powder of $U_3O_8$ and release the volatile fission products. This process is very temperature sensitive and it has been estimated that in a large commercial plant the reaction temperature would have to be maintained within a relatively narrow range, probably at about 480° C., plus or minus 10° C.

Another technique for removal of volatile fission products involves a pyrochemical process wherein the fuel cladding is melted or alloyed with another metal followed by a reduction step wherein the uranium and/or plutonium metal are produced by reduction in the presence of a molten salt. The fission gases are released during the decladding and reduction steps; however, one disadvantage of this technique is the addition of salts to the waste stream.

While the above designated processes provide for the removal of volatile fission products from irradiated fuel prior to reprocessing, they could present some difficulties in large-scale commercial operations due to the narrow temperature range required in one system and the salt addition to waste streams in the second system. Therefore, a method for releasing volatile fission products from irradiated fuel under commercially reasonable processing conditions and in a commercially reasonable time is desirable and could result in major process economies in reduction of costs for the reprocessing of nuclear fuels.

SUMMARY OF THE INVENTION

This invention relates to a simplified, relatively quick and commercially attractive method for removing volatile fission products from irradiated fuel prior to reprocessing.

More particularly, this invention relates to a method of removing volatile fission products from irradiated nuclear fuel by first passing an inert gas containing hydrogen by said fuel which is heated to an elevated temperature of at least about 1000° C. and then passing an inert gas alone by said fuel which is at said elevated temperature.

DETAILED DESCRIPTION OF THE INVENTION

In accordance with this invention volatile fission products, i.e. tritium, krypton, xenon and iodine are removed from irradiated fuel, i.e. uranium and plutonium and more particularly $UO_2$, $PuO_2$ or mixtures thereof, prior to reprocessing.

The gaseous fission products are removed in a two-step process where initially an inert gas containing hydrogen is swept past the irradiated fuel which is heated to an elevated temperature and in the second step inert gas alone is swept past the fuel which is maintained at the same elevated temperature. Any inert gas may be used in the process with helium or argon most often being used.

An important feature of this invention is the addition of hydrogen to the inert gas during one of the two steps. It was found that at an elevated temperature of 1000° C. or greater, the presence of hydrogen in the sweep gas greatly reduced the time necessary to remove substantially all (i.e. greater than about 98%) of the tritium fission product. At the same time it was found that at the same elevated temperature, the presence of hydrogen in the sweep gas suppressed to some degree the removal of other fission products, notably xenon and krypton. Consequently, in accordance with the method of this invention, a two-step procedure is followed, one step including the presence of hydrogen and the other step without it. By using this two-step method carried out at elevated temperatures, the removal of the volatile fission products is more complete and more important, can be accomplished in a shorter, more reasonable time period. Another advantage of this method is that the fuel remains in the same form and chemical composition.

The temperature at which the fuel is at during the operation will generally be at least about 1000° C. and more particularly from about 1000° to about 1600° C. Preferably the temperature of the fuel will be at least about 1100° C. and more preferably at least about 1400° C. One embodiment of this invention involves carrying out the first step in the presence of hydrogen at a temperature of about 1000° to 1200° C. and the second step with just inert gas at a temperature of about 1400° to 1600° C. This allows essentially all of the tritium to be removed in the first step and a substantial portion of the krypton to be removed in the second step.

The amount of hydrogen used during one step of the process can be varied and more particularly from about 0.5 to about 10% by volume of hydrogen in inert gas and preferably about 2 to about 4% of hydrogen in inert gas can be used. The total volume of gas used is not particularly critical and generally from about 10 to 100 reactor volumes will be used during the treatment period. The time of each step is not particularly critical and will vary to some extent depending upon operating conditions, most notably the temperature. Generally, a time period for each step of about 2 to 4 hours will remove essentially all of the volatile fission products, particularly when the higher operating temperatures are used.

Having thus described the present invention, it is believed the same will become even more apparent by reference to the following examples which are included for the purposes of illustration and which are in no way intended to limit the scope of the invention.

EXAMPLE 1

Two samples of irradiated $UO_2$ fuel pellets (~1.61 and 0.8 g respectively) were heated to a temperature of 1100° C. while passing a gas of 6% hydrogen in helium (~500 ml./min). The amount of tritium in the original samples and periodically thereafter while passing the gas was determined by gas chromatography using a LECO impulse furnace at 2600° C.

One hour of outgassing at temperature (it took 35 minutes to reach a temperature of 1100° C.) resulted in approximately 96.5 and 98.4% of the tritium being removed for each sample respectively. After two hours of outgassing at 1100° C., approximately 98.9 and 99.3% of the tritium was removed.

Using similar irradiated samples of the same type $UO_2$ fuel pellets (~0.82 and 7.4 g), a gas of 6% hydrogen in helium (~350 ml./min) and a temperature of 1100° C., about 67 and 65.2% of the krypton gas and less than 0.5% (in both cases) of the xenon was outgassed after six hours at temperature.

The xenon and krypton amounts were determined in the same manner as the tritium described above, i.e. by gas chromatography using a LECO impulse furnace at 2600° C. All further amounts noted in the following examples were also determined by the technique.

EXAMPLE 2

Two samples (1.01 and 0.98 g) of irradiated mixed oxide fuel pellets (5% $PuO_2/UO_2$) were heated to a temperature of 1100° C. while passing a gas of 6% hydrogen in helium (~500 ml./min). After one hour of outgassing at temperature 98.8 and 92.9% of the tritium was removed from each sample respectively.

Using similar irradiated samples of the same type mixed oxide fuel pellets (1.52 and 1.46 g), a gas of 6% hydrogen in helium (~350 ml./min) and a temperature of 1100° C., about 50.3 and 57% of the krypton and 0.8 and 1% of the xenon was outgassed after six hours at temperature.

EXAMPLE 3

A 1.12 g sample of irradiated $UO_2$ fuel pellets was heated to a temperature of 1500° C. while passing a gas of 6% hydrogen in helium (500 ml./min). About 99.4% of the tritium was outgassed in 100 minutes.

Using similar irradiated samples of the same type $UO_2$ fuel pellets (0.60 and 0.56 g), a gas of 6% hydrogen in helium (350 ml./min) and a temperature of 1500° C., 69 and 67% of the krypton and 26 and 26.3% of the xenon were outgassed after six hours.

EXAMPLE 4

A 1.37 g sample of irradiated mixed oxide fuel pellets (5% $PuO_2/UO_2$) was heated to a temperature of 1500° C. while passing a gas of 6% hydrogen in helium (500 ml./min). About 98.5% of tritium was removed after 95 minutes.

Using similar irradiated samples of the same mixed oxide fuel pellets (1.17 and 0.76 g), a gas of 6% hydrogen in helium (350 ml./min) and a temperature of 1500° C., about 59 and 32.7% of the krypton and 72.7 and 57% of the xenon were outgassed in six hours.

EXAMPLE 5

A 0.96 g sample of irradiated $UO_2$ fuel pellets was heated to a temperature of 1100° C. while passing helium gas (500 ml./min). About 91.0% of the tritium was outgassed in 95 minutes as compared to the 96.5 and 98.5% removed when the hydrogen-containing helium gas was used (Example 1).

EXAMPLE 6

A 0.78 g sample of irradiated $UO_2$ fuel pellets was heated to a temperature of 1500° C. while passing helium gas (350 ml./min). About 99% of both krypton and xenon were removed after six hours of outgassing as compared with an amount of about 68% krypton and 26% xenon when using the hydrogen-containing helium gas (Example 3).

EXAMPLE 7

A 0.49 g sample of irradiated mixed oxide fuel (50% $PuO_2/UO_2$) was heated to a temperature of 1100° C. while passing helium gas (350 ml./min). About 44.3% of the xenon was outgassed after six hours which compares with about 1% when the hydrogen-containing helium gas was used (Example 2).

EXAMPLE 8

A 1.01 g sample of irradiated mixed oxide fuel (5% $PuO_2/UO_2$) was heated to a temperature of 1500° C. while passing helium gas (350 ml./min). About 77.3% of the krypton and 95.7% of the xenon were outgassed after six hours which compares with the significantly smaller amounts, 59 and 32.7% of krypton and 72.7 and 57% of xenon, shown in Example 4.

EXAMPLE 9

For comparative purposes to show the effects at lower temperatures, samples of similar irradiated fuel pellets were subjected to outgassing using both inert gas (argon) and 4% of hydrogen in argon at temperatures of 500°, 700° and 850° C. In the case of the $UO_2$ fuel pellets, less than 2% of the tritium was removed at each temperature after four hours of outgassing in argon alone and less than an additional 4% of the tritium was removed at each temperature after four more hours of outgassing in argon containing 4% hydrogen.

When using the mixed oxide fuel, less than 30% of tritium was removed at each temperature after four hours outgassing in argon and less than an additional 16% of tritium was removed at each temperature after four more hours of outgassing in argon containing 4% hydrogen.

A review of the results of all the examples described above will clearly disclose that the volatile fission gases are more readily removed at the higher temperatures of greater than 1000° C. with tritium being removed more readily in a gas which contains hydrogen whereas xenon and krypton are more easily removed in an inert gas alone. Consequently, the most effective and quickest method of removing essentially all of the fission products is to use the two-step method of this invention.

What is claimed is:

1. A method for removing volatile fission products from irradiated fuel which comprises (a) passing hydrogen in the presence of an inert gas by said fuel which is heated to a temperature of at least about 1000° C. for a sufficient time to remove a significant portion of said fission products and (b) passing an inert gas alone by said fuel while at said elevated temperature.

2. The method of claim 1 wherein the temperature to which the fuel is heated is at least about 1400° C.

3. The method of claim 1 wherein said fuel is selected from the group consisting of uranium oxide, plutonium oxide and mixtures thereof.

4. The method of claim 3 wherein said inert gas is helium or argon.

5. The method of claim 4 wherein the temperature to which the fuel is heated is at least about 1400° C.

6. The method of claim 5 wherein from about 0.5 to about 10% by volume of hydrogen in said inert gas is used.

7. The method of claim 6 wherein the volatile fission products are tritium, xenon, krypton and iodine.

8. The method of claim 1 wherein step (a) is carried out at a temperature of about 1000° to about 1200° C. and wherein step (b) is carried out at a temperature of about 1400° to about 1600° C.

9. The method of claim 8 wherein said fuel is selected from the group consisting of uranium oxide, plutonium oxide and mixtures thereof.

10. The method of claim 9 wherein said inert gas is helium or argon.

11. The method of claim 10 wherein from about 0.5 to about 10% by volume of hydrogen in said inert gas is used.

* * * * *